United States Patent
Sendelbach et al.

(10) Patent No.: US 9,990,298 B2
(45) Date of Patent: Jun. 5, 2018

(54) SYSTEM AND METHOD FOR CACHING SOLID STATE DEVICE READ REQUEST RESULTS

(71) Applicant: Western Digital Technologies, Inc., Irvine, CA (US)

(72) Inventors: Lee Anton Sendelbach, Eagan, MN (US); Jeffrey S. Werning, Rochester, MN (US)

(73) Assignee: WESTERN DIGITAL TECHNOLOGIES, INC, San Jose, CA (US)

(*) Notice: Subject to any disclaimer, the term of this patent is extended or adjusted under 35 U.S.C. 154(b) by 681 days.

(21) Appl. No.: 14/275,468

(22) Filed: May 12, 2014

(65) Prior Publication Data

US 2015/0324134 A1    Nov. 12, 2015

(51) Int. Cl.
*G06F 13/36* (2006.01)
*G06F 3/00* (2006.01)
(Continued)

(52) U.S. Cl.
CPC .......... *G06F 12/0868* (2013.01); *G06F 3/064* (2013.01); *G06F 3/0613* (2013.01);
(Continued)

(58) Field of Classification Search
CPC ....... H04L 49/90; G06F 3/061; G06F 3/0656; G06F 3/0659; G06F 13/1642; G06F 5/065
(Continued)

(56) References Cited

U.S. PATENT DOCUMENTS 5,481,701 A    1/1996  Chambers, IV
5,778,411 A *  7/1998  DeMoss ................ G06F 3/0607
                                                        710/68
(Continued)

FOREIGN PATENT DOCUMENTS

WO    WO-2013022915 A1    2/2013
WO    WO-2013052562 A1    4/2013
WO       2014049636 A1    4/2014

OTHER PUBLICATIONS

De, Arup et al. "Minerva: Accelerating Data Analysis in Next-Generation SSDSs." 2013 21st Annual International IEEE Symposium on Field Programmable Custom Computing Machines. IEEE Computer Society. No Month Listed 2013. 8 pages.
(Continued)

*Primary Examiner* — Faisal M Zaman
(74) *Attorney, Agent, or Firm* — Patterson & Sheridan, LLP; Steven Versteeg

(57) ABSTRACT

Techniques for caching results of a read request to a solid state device are disclosed. In some embodiments, the techniques may be realized as a method for caching solid state device read request results comprising receiving, at a solid state device, a data request from a host device communicatively coupled to the solid state device, and retrieving, using a controller of the solid state device, a compressed data chunk from the solid state device in response to the data request. The techniques may further include decompressing the compressed data chunk, returning, to the host device, a block of the data chunk responsive to the data request, and caching one or more additional blocks of the data chunk in a data buffer for subsequent read requests.

19 Claims, 4 Drawing Sheets

(51) Int. Cl.
*G06F 5/00* (2006.01)
*G06F 12/0868* (2016.01)
*G06F 3/06* (2006.01)
*G06F 12/123* (2016.01)
*G06F 13/40* (2006.01)
*G06F 13/42* (2006.01)
*G06F 12/122* (2016.01)

(52) U.S. Cl.
CPC .......... *G06F 3/0656* (2013.01); *G06F 3/0688* (2013.01); *G06F 12/122* (2013.01); *G06F 12/123* (2013.01); *G06F 13/4022* (2013.01); *G06F 13/4221* (2013.01); *G06F 2212/604* (2013.01)

(58) Field of Classification Search
USPC ........ 710/22, 33, 34, 35, 52, 55, 56, 57, 61, 710/74, 301, 110, 305, 306, 308, 310, 710/313
See application file for complete search history.

(56) References Cited

U.S. PATENT DOCUMENTS

| | | | | |
|---|---|---|---|---|
| 5,946,276 A * | 8/1999 | Ridges | ............. | G11B 20/10527 710/52 |
| 6,105,080 A * | 8/2000 | Holt | ........... | G06F 13/28 710/26 |
| 6,243,767 B1 * | 6/2001 | Young | ............. | G06F 12/0653 710/3 |
| 6,889,256 B1 * | 5/2005 | Palevich | .......... | G06F 17/30067 707/E17.01 |
| 6,952,797 B1 * | 10/2005 | Kahn et al. | ................ | 714/770 |
| 7,181,608 B2 * | 2/2007 | Fallon | ............. | G06F 3/0613 711/113 |
| 7,392,340 B1 * | 6/2008 | Dang et al. | .............. | 711/111 |
| 7,493,450 B2 * | 2/2009 | Bearden | ................... | 711/137 |
| 8,387,073 B1 * | 2/2013 | Micalizzi | ........... | H04L 67/1097 709/227 |
| 8,429,351 B1 * | 4/2013 | Yu et al. | ................ | 711/132 |
| 8,527,693 B2 | 9/2013 | Flynn et al. | | |
| 8,825,937 B2 * | 9/2014 | Atkisson et al. | ........... | 711/102 |
| 2003/0120835 A1 * | 6/2003 | Kale | ............ | G06F 13/28 710/22 |
| 2003/0217237 A1 * | 11/2003 | Benveniste | ............ | G06F 12/08 711/153 |
| 2004/0076191 A1 * | 4/2004 | Sundqvist | .............. | H04L 47/10 370/516 |
| 2004/0111557 A1 * | 6/2004 | Nakatani et al. | ............ | 711/113 |
| 2004/0215868 A1 * | 10/2004 | Solomon | .......... | G06F 13/4059 710/317 |
| 2005/0111471 A1 * | 5/2005 | Krischer | ............ | H04L 12/4633 370/412 |
| 2006/0047868 A1 * | 3/2006 | Rohde | ................ | G06F 13/385 710/56 |
| 2007/0011398 A1 * | 1/2007 | Van Niekerk | ................ | 711/111 |
| 2009/0106758 A1 * | 4/2009 | Giampaolo | ................. | 718/101 |
| 2009/0216936 A1 * | 8/2009 | Chu et al. | ................... | 711/103 |
| 2009/0228668 A1 * | 9/2009 | Borkenhagen | .......... | G06F 12/08 711/161 |
| 2010/0057949 A1 * | 3/2010 | Weber | ................ | G06F 3/0605 710/22 |
| 2010/0281004 A1 * | 11/2010 | Kapoor | ........... | G06F 17/30501 707/693 |
| 2010/0332700 A1 * | 12/2010 | Fallon | ............ | 710/68 |
| 2011/0296090 A1 * | 12/2011 | Cornwell | ............... | G06F 3/061 711/103 |
| 2012/0089781 A1 * | 4/2012 | Ranade | ............ | G06F 17/30203 711/118 |
| 2012/0185620 A1 * | 7/2012 | Cheng | ................ | H04N 19/176 710/52 |
| 2012/0239889 A1 | 9/2012 | Lee et al. | | |
| 2012/0259969 A1 * | 10/2012 | Mastrangelo | ....... | G06F 11/3419 709/224 |
| 2013/0031306 A1 * | 1/2013 | Kim | ............................ | 711/113 |
| 2013/0117744 A1 | 5/2013 | Klein et al. | | |
| 2013/0145085 A1 | 6/2013 | Yu et al. | | |
| 2013/0191601 A1 * | 7/2013 | Peterson et al. | ............. | 711/137 |
| 2013/0259394 A1 * | 10/2013 | Bar-On | ................ | H04N 19/176 382/233 |
| 2013/0332652 A1 | 12/2013 | Hayashi | | |
| 2014/0108703 A1 * | 4/2014 | Cohen et al. | ................. | 711/103 |
| 2014/0122780 A1 * | 5/2014 | Smith et al. | .................. | 711/103 |
| 2014/0359219 A1 * | 12/2014 | Evans | ............... | G06F 12/0802 711/118 |
| 2015/0074328 A1 * | 3/2015 | Baryudin et al. | ............. | 711/103 |
| 2015/0074355 A1 * | 3/2015 | Sampathkumar et al. | ... | 711/135 |
| 2015/0127882 A1 * | 5/2015 | Carlson | ............... | G06F 12/0246 711/103 |
| 2015/0248292 A1 * | 9/2015 | Koker | ................ | G06F 9/30043 711/123 |
| 2016/0342545 A1 * | 11/2016 | Arai | ................ | G06F 12/0868 |

OTHER PUBLICATIONS

Huang, Ting-Chang et al. "Extending Lifetime and Reducing Garbage Collection Overhead of Solid State Disks with Virtual Machine Aware Journaling." 2011 IEEE 17th International Conference on Parallel and Distributed Systems. IEEE Computer Soceity. No Month Listed 2011. 8 pages.

Office Action issued in corresponding French Patent Application No. 1554092, dated Feb. 27, 2018 (5 pages).

\* cited by examiner

SYSTEM AND METHOD FOR CACHING SOLID STATE DEVICE READ REQUEST RESULTS

BACKGROUND

In an Solid State Device (SSD) adapter which does data compression, several Logical Block Addressed blocks (LBAs) can be bundled together to form a much bigger unit (e.g., a data chunk). This unit can be then run through a compression engine on the adapter which can make the compressed LBA blocks take up much less space than if they were stored in their natural size. This compressed data chunk is then stored on the SSD (e.g., on NAND type flash memory). The size reduction can be 50% or more. This means several LBA blocks can be stored as a single unit in flash memory. When these LBA blocks are accessed to read, the compressed data chunk must be retrieved from the flash memory and then decompressed. Out of all the decompressed LBA blocks potentially only a single LBA block is needed to satisfy the read request.

Peripheral Component Interconnect Express (PCIe) is frequently used to connect SSDs to a host system. PCI-Express system architecture faces a performance constraints. First, typical PCI-Express fabrics with high device fan-out (such as an enterprise storage backplane) have lower total upstream bandwidth (from a PCI-Express Switch upstream to the host) than downstream bandwidth (from the same PCI-Express Switch downstream to all connected storage controllers). This may present a bottle neck at a PCIe switch if bandwidth of downstream resources is greater than upstream bandwidth. Such a bottleneck may delay retrieval of read results from an SSD to a host device.

SUMMARY OF THE DISCLOSURE

Techniques for caching results of a read request to a solid state device are disclosed. In some embodiments, the techniques may be realized as a method for caching solid state device read request results comprising receiving, at a solid state device, a data request from a host device communicatively coupled to the solid state device, and retrieving, using a controller of the solid state device, a compressed data chunk from the solid state device in response to the data request. The techniques may further include decompressing the compressed data chunk, returning, to the host device, a block of the data chunk responsive to the data request, and caching one or more additional blocks of the data chunk in a data buffer for subsequent read requests.

In accordance with additional aspects of this exemplary embodiment, the data chunk can be indicated by a logical block address.

In accordance with additional aspects of this exemplary embodiment, the data buffer can be provided in memory of the solid state device.

In accordance with additional aspects of this exemplary embodiment, the data buffer can be provided in Peripheral Component Interconnect Express (PCIe) associated memory of the host device.

In accordance with additional aspects of this exemplary embodiment, the techniques can include receiving a second data request from the host device, determining that data responsive to the second data request is contained in the data buffer, and servicing the second data request from the host device using data contained in the data buffer.

In accordance with further aspects of this exemplary embodiment, servicing the second data request from the host device using data contained in the data buffer can include providing a scatter gather list entry to the host device pointing to memory in the data buffer containing the responsive data.

In accordance with further aspects of this exemplary embodiment, determining that data responsive to the second data request is contained in the data buffer can be performed by a driver on the host device.

In accordance with further aspects of this exemplary embodiment, determining that data responsive to the second data request is contained in the data buffer can be performed by the solid state device.

In accordance with further aspects of this exemplary embodiment, the scatter gather list can be provided from a driver on the host device.

In accordance with additional aspects of this exemplary embodiment, the techniques can further include journaling one or more writes to data on the solid state device, and determining, based on the one or more journaled write requests whether data in the data buffer is valid.

In accordance with additional aspects of this exemplary embodiment, the techniques can further include receiving a second data request from the host device, determining that data responsive to the second data request is contained in the data buffer, and determining, based on one or more journaled write requests that data in the data buffer is not valid. Based on the determination that that valid responsive data is not in the buffer the techniques may include retrieving, using the controller of the solid state device, a second compressed data chunk from the solid state device; decompressing the second compressed data chunk, and returning, to the host device, a block of the second data chunk responsive to the second data request.

In accordance with further aspects of this exemplary embodiment, the techniques may include using an algorithm to maintain the data buffer.

In accordance with additional aspects of this exemplary embodiment, the algorithm may include at least one of a least recently used algorithm for aging data out of the data buffer, a least frequently used algorithm for aging data out of the data buffer, and an adaptive replacement caching algorithm for aging data out of the data buffer.

In accordance with additional aspects of this exemplary embodiment, the host device may include at least one of: an enterprise server, a database server, a workstation, and a computer.

In accordance with additional aspects of this exemplary embodiment, the solid state device may include a Peripheral Component Interconnect Express (PCIe) device. Although described as a solid state device, embodiments may include devices which may not be solid state devices (e.g., PCIe hard disk drives).

In some embodiments, the techniques for caching solid state device read request results may be realized as a computer program product comprised of a series of instructions executable on a computer, the computer program product performing a process for caching solid state device read request results. The computer program may implement the steps of receiving, at a solid state device, a data request from a host device communicatively coupled to the solid state device, retrieving, using a controller of the solid state device, a compressed data chunk from the solid state device in response to the data request, decompressing the compressed data chunk, returning, to the host device, a block of the data chunk responsive to the data request, and caching one or more additional blocks of the data chunk in a data buffer for subsequent read requests.

In some embodiments, the techniques for caching solid state device read request results may be realized as a system for caching solid state device read request results. The system can include a host device and a first Peripheral Component Interconnect Express (PCIe) device. The first Peripheral Component Interconnect Express (PCIe) device can include instructions stored in memory. The instructions can include an instruction to send one or more blocks of a data chunk decompressed in response to a first data request to a data buffer. The system can also include a Peripheral Component Interconnect Express (PCIe) switch communicatively coupling the first PCIe device and the host device, wherein the host device includes instructions stored in memory. The instructions stored in host device memory can include an instruction to determine whether data responsive to a second data request is contained in the data buffer, and an instruction to service the second data request from data contained in the data buffer based upon a determination that data responsive to the second data request is contained in the data buffer.

In accordance with additional aspects of this exemplary embodiment, the data buffer can be provided in memory of the solid state device.

In accordance with additional aspects of this exemplary embodiment, the data buffer can be provided in Peripheral Component Interconnect Express (PCIe) associated memory of the host device.

In accordance with additional aspects of this exemplary embodiment, the techniques may further include an instruction to determine, at a driver on the host device, that data responsive to a second data request is contained in the data buffer, and an instruction to service the second data request from the host device using data contained in the data buffer, wherein servicing the second data request from the host device using data contained in the data buffer comprises providing a scatter gather list entry to the host device pointing to memory in the data buffer containing the responsive data.

The present disclosure will now be described in more detail with reference to exemplary embodiments thereof as shown in the accompanying drawings. While the present disclosure is described below with reference to exemplary embodiments, it should be understood that the present disclosure is not limited thereto. Those of ordinary skill in the art having access to the teachings herein will recognize additional implementations, modifications, and embodiments, as well as other fields of use, which are within the scope of the present disclosure as described herein, and with respect to which the present disclosure may be of significant utility.

BRIEF DESCRIPTION OF THE DRAWINGS

In order to facilitate a fuller understanding of the present disclosure, reference is now made to the accompanying drawings, in which like elements are referenced with like numerals. These drawings should not be construed as limiting the present disclosure, but are intended to be exemplary only.

DESCRIPTION

The present disclosure relates to caching solid state device read request results. Embodiments of the present disclosure provide systems and methods by which blocks which are retrieved in response to a read request, but are not necessary to satisfy a read request, may be cached. In an Solid State Device (SSD) adapter which does data compression, several Logical Block Addressed blocks (LBAs) can be bundled together to form a much bigger unit. This unit can be then run through a compression engine on the adapter which can make the compressed LBA blocks take up much less space than if they were stored in their natural size. This compressed data chunk is then stored on the SSD (e.g., on NAND type flash memory). The size reduction can be 50% or more. This means several LBA blocks can be stored as a single unit in flash memory. When these LBA blocks are accessed to read, the compressed data chunk must be retrieved from the flash memory and then decompressed. Out of all the decompressed LBA blocks potentially only a single LBA block is needed to satisfy the read request. Systems traditionally discard the decompressed blocks which are not necessary to satisfy a read request. Embodiments of the present disclosure provide systems and methods for caching such extra blocks. In some embodiments, such caching may be performed on an SSD device. In one or more embodiments, such caching may be performed on a host device (e.g., in Non-Volatile Memory express (NVMe) Specification based embodiments). Caching, either on a host or a SSD can improve sequential read performance. Caching using memory of a host may free up space in a PCIe adapter to store blocks for future access. Caching in memory associated with a host may also use the large memory in the host to speculatively store reads. This may provide quicker access to a host for speculative reads and may improve the performance of a PCIe based SSD adapter.

Figure 1:
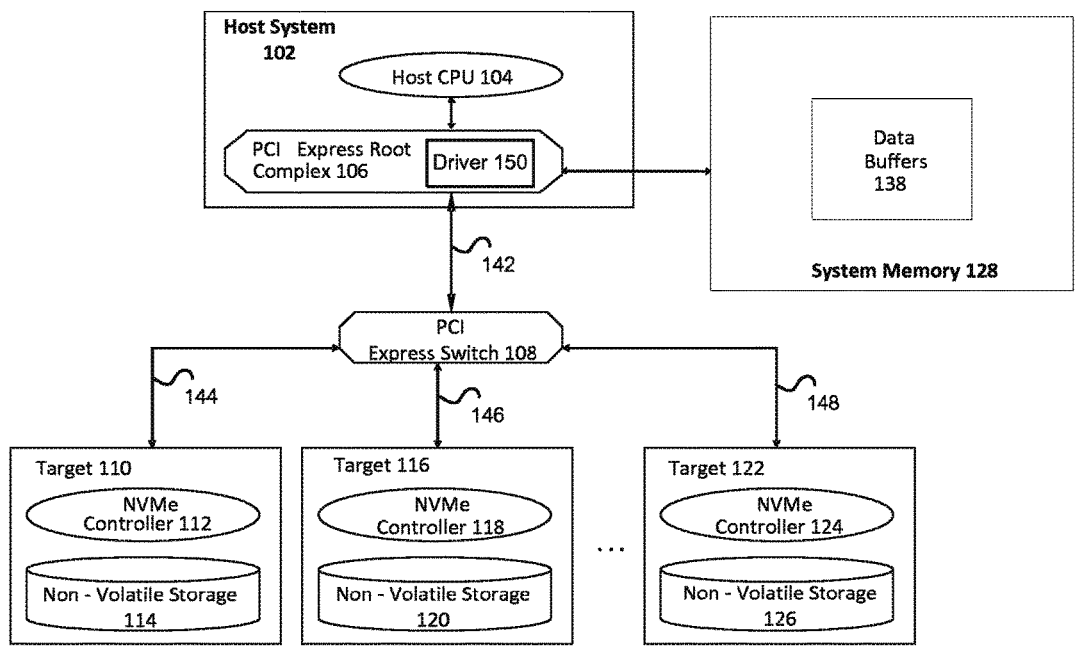
FIG. 1 shows an exemplary block diagram depicting a plurality of solid state devices in communication with a host device, in accordance with an embodiment of the present disclosure.

Turning now to the drawings, FIG. 1 is an exemplary block diagram depicting a solid state device in communication with a host device, in accordance with an embodiment of the present disclosure. FIG. 1 includes a number of computing technologies such as a host system 102, host CPU 104, and PCI express root complex 106 containing driver 150. PCI express switch 108 may communicatively couple a plurality of targets (e.g., solid state devices such as NVMe based targets) such as Targets 110, 116 and 122 to host system 102 via PCI express root complex 106.

Target 110 may contain NVMe controller 112 and non-volatile storage 114. Target 116 may contain NVMe controller 118 and non-volatile storage 120. Target 122 may contain NVMe controller 124 and non-volatile storage 126.

System memory 128 may contain memory based resources accessible to Host System 102 via a memory interface (e.g., double data rate type three synchronous dynamic random access memory (DDR3 SDRAM)). System memory 128 can take any suitable form, such as, but not limited to, a solid-state memory (e.g., flash memory, or solid state device (SSD)), optical memory, and magnetic memory. While system memory 128 is preferably non-volatile, a volatile memory also can be used. As illustrated in FIG. 1, system memory 128 may contain one or more data structures such as, for example, data buffers 138.

Connection 142 between PCI express root complex 106 and PCI express switch 108 may be, for example, a PCI-Express based interface. Connections 144, 146, and 148 may also be PCI-Express based interfaces. While only connections 144, 146, and 148 are illustrated it may be appreciated that a number of targets connected to PCI express switch 108 may be less or significantly more (e.g., 96 devices). As the number of targets connected to PCI express switch 108 increases the bandwidth at connection 142 may become a chokepoint.

According to some embodiments, interfaces standards other than PCIe may be used for one or more portions including, but not limited to, Serial Advanced Technology Attachment (SATA), Advanced Technology Attachment (ATA), Small Computer System Interface (SCSI), PCI-extended (PCI-X), Fibre Channel, Serial Attached SCSI (SAS), Secure Digital (SD), Embedded Multi-Media Card (EMMC), and Universal Flash Storage (UFS).

The host system 102 can take any suitable form, such as, but not limited to, an enterprise server, a database host, a workstation, a personal computer, a mobile phone, a game device, a personal digital assistant (PDA), an email/text messaging device, a digital camera, a digital media (e.g., MP3) player, a GPS navigation device, and a TV system.

The host system 102 and the target device can include additional components, which are not shown in FIG. 1 to simplify the drawing. Also, in some embodiments, not all of the components shown are present. Further, the various controllers, blocks, and interfaces can be implemented in any suitable fashion. For example, a controller can take the form of one or more of a microprocessor or processor and a computer-readable medium that stores computer-readable program code (e.g., software or firmware) executable by the (micro)processor, logic gates, switches, an application specific integrated circuit (ASIC), a programmable logic controller, and an embedded microcontroller, for example.

In an SSD adapter which does data compression, several LBA blocks are bundled together to form a much bigger unit. This unit can then run through a compression engine on an SSD adapter which can makes LBA blocks use less space than if they were stored in their natural size. This data chunk can then be stored on the SSD. The size reduction can be 50% or more. This means several LBA blocks can be stored as a single unit on an SSD. When these LBA blocks are accessed to read, the data chunk must be retrieved from the SSD, and decompression is applied to it. This means all the LBA blocks have been decompressed, but potentially only a single LBA block is needed to satisfy the read request. The other LBA blocks can be carried in the SSD in RAM to satisfy future requests.

Embodiments of the present disclosure can improve SSD read performance by using other LBA blocks which are retrieved during normal processing of a read request on a compression based SSD, but are not necessary to satisfy the read request. These LBAs blocks could be stored (e.g., buffered) on a SSD adapter, on host storage, or in another accessible location.

In PCIe embodiments, a high bandwidth PCIe bus and availability of host storage may facilitate storage of these LBA blocks on host based storage. This speculative storage of read LBA blocks on a host system, can be used to increase performance in sequential or random read scenarios. When the host asks for these cached LBA blocks, the adapter can respond with a SGL (scatter gather list) entry which points to memory on the host machine.

For example, a driver on an adapter can contain instructions to watch read requests from a host. If a read request is received, a driver may determine whether one or more blocks necessary to satisfy the read request is in a buffer. If it is determined that one or more blocks necessary to satisfy a read request are in a buffer, a driver may provide a scatter/gather list (SGL) element which points to the memory location of the appropriate buffered LBA block. The host can retrieve the LBA block as if the SSD had direct memory accessed (DMA'd) it to memory. This can result in a very low latency read which can greatly increase performance.

According to some embodiments, software may reside outside of a driver that may handle buffering and monitoring of read requests. In one or more embodiments, a custom command may be provided (e.g., a custom read command) which may check the availability of data in a buffer prior to reading from an SSD. Methods for read requests that utilize a buffer may be incorporated into one or more standards (e.g., NVMe standards.)

According to some embodiments, buffers may be maintained using journaling. For example, journaling in an adapter can be used to make sure the data in the host is valid before the host is redirected to this data. A driver may monitor and journal one or more write requests. Journaling can track whether a write request has made the data which was earlier sent to a buffer invalid. A driver may contain a data structure that may indicate blocks (e.g., LBAs in a buffer). If a write request is detected by the driver that corresponds to one of these blocks, the block in the buffer may be invalidated and/or discarded. For subsequent read requests corresponding to such block, the adapter and/or driver may have to re-access the data chunk and get the LBA block again.

In some embodiments, one or more algorithms may be used to maintain a data buffer. For example, a driver may use a least recently used algorithm for aging data out of the data buffer, a least frequently used algorithm for aging data out of the data buffer, and/or an adaptive replacement caching algorithm for aging data out of the data buffer.

Figure 2:
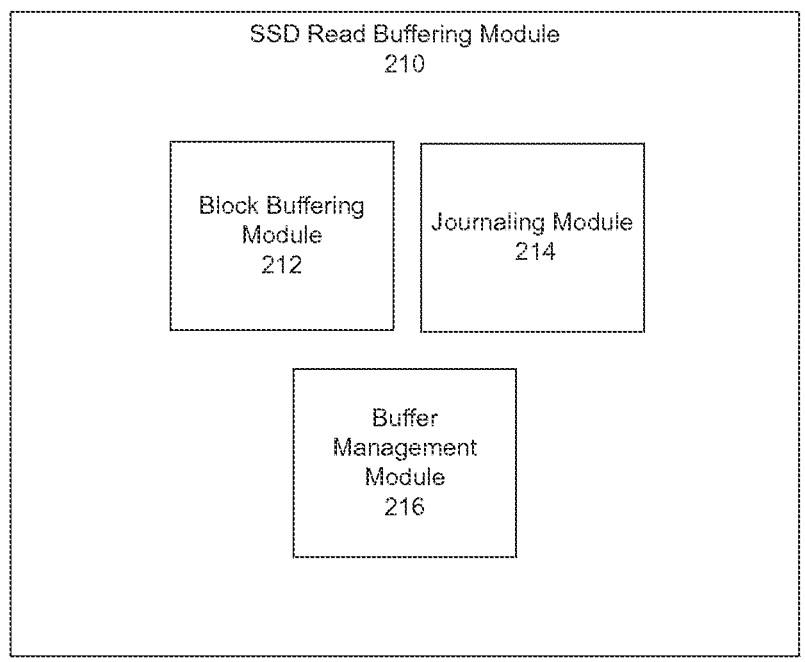
FIG. 2 depicts an exemplary module for caching solid state device read request results, in accordance with an embodiment of the present disclosure.
Figure 3:
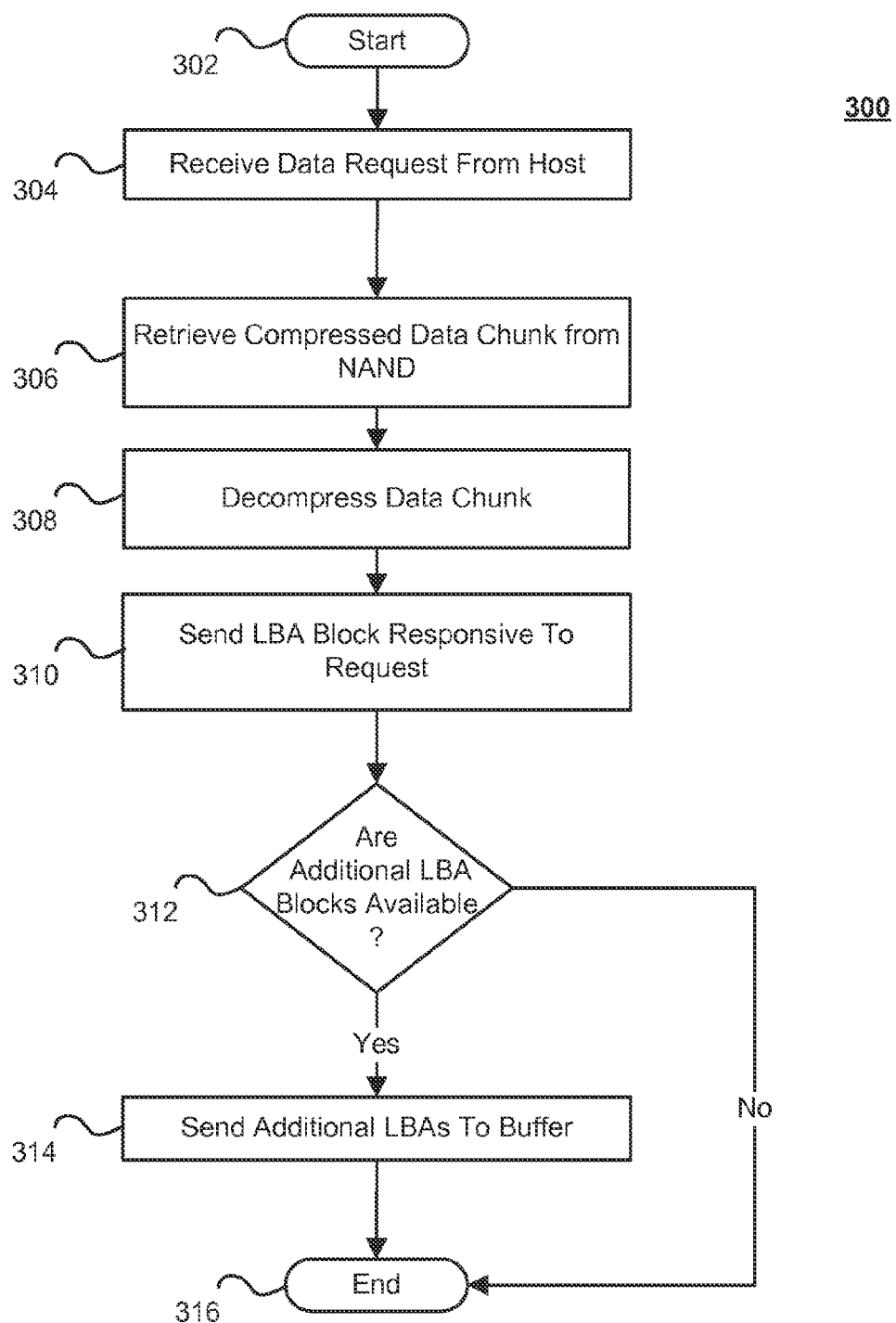
FIG. 3 depicts a flowchart illustrating caching solid state device read request results, in accordance with an embodiment of the present disclosure.

FIG. 2 depicts an exemplary module for caching solid state device read request results, in accordance with an embodiment of the present disclosure. As illustrated in FIG. 3, SSD Read Caching Module 210 may contain Block Buffering Module 212, Journaling Module 214, and Buffer Management Module 216. In one or more embodiments, SSD Read Caching Module 210 may be implemented in a device driver (e.g., driver 150 of FIG. 1) or on a host OS (e.g., Host CPU 104 of FIG. 1). According to some embodiments SSD Read Caching Module 210 may be implemented in an adapter of an SSD (e.g., target 110, target 116, or target 122 of FIG. 1).

Block Buffering Module 212 may cache one or more blocks retrieved and decompressed as part of a read request. Compressed LBA blocks may store 50% more or an even greater percentage blocks than if such blocks were uncompressed. This means several LBA blocks can be stored as a single unit in flash memory. When these LBA blocks are accessed to read, the compressed data chunk must be retrieved from the flash memory and then decompressed. Out of all the decompressed LBA blocks potentially only a single LBA block is needed to satisfy the read request. Block Caching Module 212 may buffer such extra blocks. In some embodiments, such buffering may be performed on an SSD device. In one or more embodiments, such buffering may be performed on a host device (e.g., in Non-Volatile Memory express (NVMe) Specification based embodiments). Block Buffering Module 212 may monitor read requests from a host. If a read request is received, Block Buffering Module 212 may determine whether one or more blocks necessary to satisfy the read request is in a buffer. If it is determined that one or more blocks necessary to satisfy a read request are in a buffer, Block Buffering Module 212 may provide a scatter/gather list (SGL) element which points to the memory location of the appropriate buffered LBA block. The host can retrieve the LBA block as if the SSD had direct memory accessed (DMA'd) it to memory.

Buffering by Block Caching Module 212, either on a host or a SSD can improve sequential read performance. Buffering using memory of a host may free up space in a PCIe adapter to store blocks for future access. Buffering in memory associated with a host may also use the large memory in the host to speculatively store reads. This may provide quicker access to a host for speculative reads and may improve the performance of a PCIe based SSD adapter.

Journaling Module 214 may check to see if the data in the host is valid before the host is redirected to this data. Journaling Module 214 may monitor and journal one or more write requests. Journaling Module 214 can track whether a write request has made the data which was earlier sent to a buffer invalid. Journaling Module 214 may contain a data structure that may indicate blocks (e.g., LBAs in a buffer). If a write request is detected by Journaling Module 214 that corresponds to one of these blocks, the block in the buffer may be invalidated and/or discarded. For subsequent read requests corresponding to such block, Journaling Module 214 may indicate that a driver may have to re-access the appropriate data chunk and get the requested LBA block again.

Buffer Management Module 216 may use one or more algorithms to maintain a data buffer. For example, Buffer Management Module 216 may use, for example, a least recently used algorithm for aging data out of the data buffer, a least frequently used algorithm for aging data out of the data buffer, and/or an adaptive replacement caching algorithm for aging data out of the data buffer. Buffer Management Module 216 may accept one or more parameters indicating a buffer size, a preferred aging algorithm, one or more memory locations to use for creation of a buffer, or other configurable buffer settings.

FIG. 3 depicts a flowchart illustrating caching solid state device read request results, in accordance with an embodiment of the present disclosure. The process 300, however, is exemplary only. The process 300 can be altered, e.g., by having stages added, changed, removed, or rearranged. At stage 302, the process may begin.

At stage 304, a data request may be received from a host. For example, a read request maybe received by a controller of an SSD for one or more LBA blocks.

At stage 306, a compressed data chunk containing a plurality of LBA blocks may be retrieved. At stage 308, the data chunk may be decompressed. The decompression may provide one or more LBA blocks which satisfy the host read request. The decompression may also provide one or more "extra" LBA blocks not requested by the host read request.

At stage 310 one or more LBA data blocks responsive to the host read request may be returned to the host (e.g., via a scatter gather list).

At stage 312 it may be determined whether additional LBA blocks are available. If additional LBA blocks are available, the method 300 may send the additional LBA blocks to a data buffer (e.g., in host memory) at stage 314. If all blocks decompressed in response to a read request were sent to the host (i.e., they were all responsive to the request), the method 300 may end at stage 316.

Figure 4:
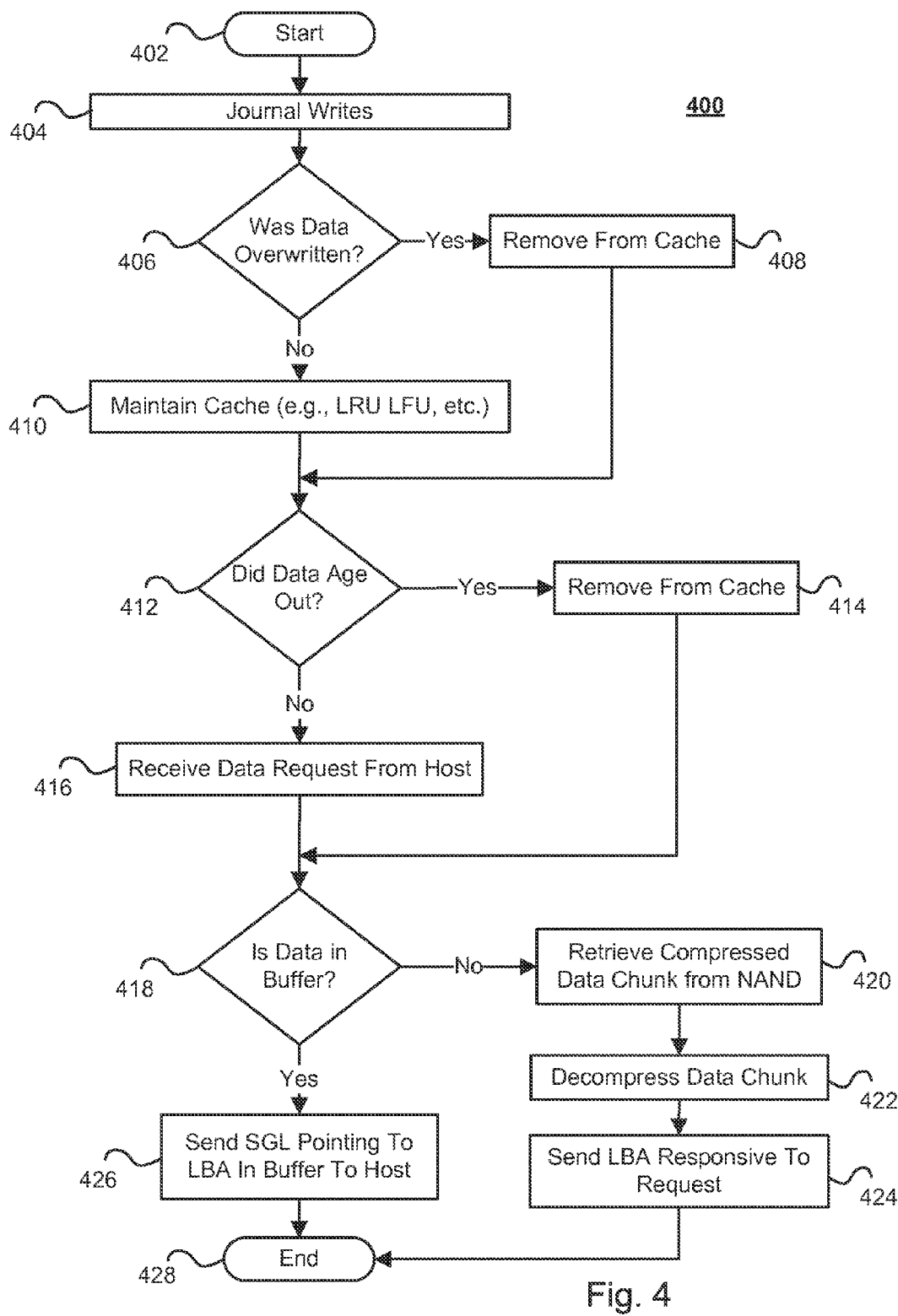
FIG. 4 depicts a flowchart illustrating caching solid state device read request results, in accordance with an embodiment of the present disclosure.

FIG. 4 depicts a flowchart illustrating caching solid state device read request results, in accordance with an embodiment of the present disclosure. The process 400, however, is exemplary. The process 400 can be altered, e.g., by having stages added, changed, removed, or rearranged. At stage 402, the process 400 may start.

At stage 404, one or more write requests may be journaled. In some embodiments, only write requests corresponding to buffered blocks may be journaled.

In some embodiments, if data is detected as overwritten at stage 406, it may be removed from a buffer at stage 408. In some embodiments, it may be marked as invalid. In one or more embodiments, a driver intercepting a read request may determine that such buffered data is invalid by reading a journal and may not access such buffered data. The buffered data which is not accessed may age out of a buffer.

At stage 410, the buffer or cache may be maintained using one or more algorithms (e.g., a least recently used algorithm for aging data out of the data buffer, a least frequently used algorithm for aging data out of the data buffer, and/or an adaptive replacement caching algorithm for aging data out of the data buffer). At stage 412 if it is determined that data has aged out of a buffer, it may be removed from the buffer (e.g., when additional data is buffered and space is required).

At stage 416 a data request may be received from a host. For example, an SSD driver on a host may monitor read requests and may receive an SSD read request from the host.

At stage 418, the driver may determine whether the requested data is in a buffer. If the requested data is in a buffer the method 400 may continue at stage 426. At stage 426, the driver may send a scatter gather list (SQL) containing one or more elements which point to the memory locations of the appropriate buffered LBA blocks. If the data is not buffered (or is invalid), the method 400 may continue at stage 420.

At stage 420 the SSD controller may retrieve the appropriate SSD data chunk to satisfy the host read request. At stage 422, the data chunk may be decompressed. At stage 424 the SSD may send the LBA data block responsive to the host read request.

At stage 428, process 400 may end.

Other embodiments are within the scope and spirit of the invention. For example, the functionality described above can be implemented using software, hardware, firmware, hardwiring, or combinations of any of these. One or more computer processors operating in accordance with instructions may implement the functions associated with caching solid state device read request results in accordance with the present disclosure as described above. If such is the case, it is within the scope of the present disclosure that such instructions may be stored on one or more non-transitory processor readable storage media (e.g., a magnetic disk or other storage medium). Additionally, modules implementing functions may also be physically located at various positions, including being distributed such that portions of functions are implemented at different physical locations.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

What is claimed is:

1. A method, comprising:
receiving, at a solid state device, a first read request from a host device communicatively coupled to the solid state device;
retrieving, using a controller of the solid state device, a first compressed data chunk from the solid state device in response to the first read request;
decompressing the first compressed data chunk to produce a first decompressed data chunk, wherein the first decompressed data chunk includes:
one or more first decompressed data blocks responsive to the first read request; and
one or more first decompressed data blocks not responsive to the first read request;
returning, to the host device, the one or more first decompressed data blocks responsive to the first read request;
caching one or more additional blocks of the first decompressed data chunk in a data buffer for subsequent read requests, wherein the one or more additional blocks include the one or more first decompressed data blocks not responsive to the first read request;
receiving, at the solid state device, a second read request from the host device;
determining that data for the second read request is in the data buffer; and
returning, to the host device, a scatter/gather list responsive to the second read request.

2. The method of claim 1, wherein the first compressed data chunk is indicated by a logical block address.

3. The method of claim 1, wherein the data buffer is provided in memory of the solid state device.

4. The method of claim 1, wherein the data buffer is provided in Peripheral Component Interconnect Express (PCIe) associated memory of the host device.

5. The method of claim 1, wherein the scatter gather list points to memory in the data buffer containing the data responsive to the second read request.

6. The method of claim 1, wherein determining that data responsive to the second read request is contained in the data buffer is performed by a driver on the host device.

7. The method of claim 1, wherein determining that data responsive to the second read request is contained in the data buffer is performed by the solid state device.

8. The method of claim 5, wherein the scatter gather list is provided from a driver on the host device.

9. The method of claim 1, further comprising:
journaling one or more writes to data on the solid state device; and
determining, based on the one or more journaled write requests whether data in the data buffer is valid.

10. The method of claim 9, further comprising:
receiving a third read request from the host device;
determining that data responsive to the third read request is contained in the data buffer;
determining, based on one or more journaled write requests that data in the data buffer is not valid;
retrieving, using the controller of the solid state device, a second compressed data chunk from the solid state device;
decompressing the second compressed data chunk to produce a second decompressed data chunk, wherein the second decompressed data chunk includes one or more second decompressed data blocks responsive to the third read request; and
returning, to the host device, the one or more second decompressed data blocks responsive to the third read request.

11. The method of claim 1, further comprising using an algorithm to maintain the data buffer.

12. The method of claim 11, wherein the algorithm comprises at least one of a least recently used algorithm for aging data out of the data buffer, a least frequently used algorithm for aging data out of the data buffer, and an adaptive replacement caching algorithm for aging data out of the data buffer.

13. The method of claim 1, wherein the host device comprises at least one of: an enterprise server, a database server, a workstation, and a computer.

14. The method of claim 1, wherein the solid state device comprises a Peripheral Component Interconnect Express (PCIe) device.

15. A non-transitory computer program product comprised of a series of instructions executable on a computer, the non-transitory computer program product performing a process for caching solid state device read request results; the non-transitory computer program product implementing the steps of:
receiving, at a solid state device, a first read request from a host device communicatively coupled to the solid state device;
retrieving, using a controller of the solid state device, a first compressed data chunk from the solid state device in response to the first read request;
decompressing the first compressed data chunk to produce a first decompressed data chunk, wherein the first decompressed data chunk includes:
one or more first decompressed data blocks responsive to the first read request; and
one or more first decompressed data blocks not responsive to the first read request;
returning, to the host device, the one or more first decompressed data blocks responsive to the first read request;
caching one or more additional blocks of the first decompressed data chunk in a data buffer for subsequent read requests, wherein the one or more additional blocks include the one or more first decompressed data blocks not responsive to the first read request;
receiving, at the solid state device, a second read request from the host device;
determining that data for the second read request is in the data buffer; and
returning, to the host device, a scatter/gather list responsive to the second read request.

16. A system for caching solid state device read request results, the system comprising:
a host device;
a first Peripheral Component Interconnect Express (PCIe) device configured or operable to:
send one or more additional blocks of a data chunk decompressed in response to a first read request to a data buffer, wherein the one or more additional blocks include one or more decompressed data blocks not responsive to the first read request; and a Peripheral Component Interconnect Express (PCIe) switch communicatively coupling the first PCIe device and the host device, wherein the host device is configured or operable to:
  determine whether data responsive to a second read request is contained in the data buffer;
  service the second read request from data contained in the data buffer based upon a determination that data responsive to the second read request is contained in the data buffer; and
  returning, to the host device, a scatter/gather list responsive to the second read request.

17. The system of claim 16, wherein the data buffer is provided in memory of the first PCIe device.

18. The system of claim 16, wherein the data buffer is provided in Peripheral Component Interconnect Express (PCIe) memory of the host device.

19. The system of claim 16, wherein the host device is further configured or operable to:
  determine, at a driver on the host device, that data responsive to a second read request is contained in the data buffer; and
  wherein the PCIe is further configured or operable to service the second read request from the host device using data contained in the data buffer, wherein servicing the second read request from the host device using data contained in the data buffer comprises providing a scatter gather list entry to the host device pointing to memory in the data buffer containing the data responsive to the second read request.

* * * * *